United States Patent
Xu et al.

(10) Patent No.: US 10,995,239 B2
(45) Date of Patent: May 4, 2021

(54) POLISHING FLUID FOR IMPROVING SURFACES FORMED BY FUSED DEPOSITION MOLDING WITH ABS AND METHOD OF PREPARING SAME

(71) Applicant: SHAANXI UNIVERSITY OF TECHNOLOGY, Shaanxi (CN)

(72) Inventors: Feng Xu, Shaanxi (CN); Yan Liu, Shaanxi (CN); Jipeng Zheng, Shaanxi (CN); Lei Fu, Shaanxi (CN); Benjun Yu, Shaanxi (CN)

(73) Assignee: SHAANXI UNIVERSITY OF TECHNOLOGY, Hanzhong (CN)

( * ) Notice: Subject to any disclaimer, the term of this patent is extended or adjusted under 35 U.S.C. 154(b) by 0 days.

(21) Appl. No.: 16/887,496

(22) Filed: May 29, 2020

(65) Prior Publication Data

US 2020/0407595 A1 Dec. 31, 2020

(30) Foreign Application Priority Data

Jun. 28, 2019 (CN) .......................... 201910579424.0

(51) Int. Cl.
*C09G 1/16* (2006.01)
(52) U.S. Cl.
CPC ..................................... *C09G 1/16* (2013.01)

(58) Field of Classification Search
CPC ....................................................... C09G 1/16
See application file for complete search history.

(56) References Cited

U.S. PATENT DOCUMENTS

| 6,800,324 B2 | 10/2004 | Chong et al. | |
| 2020/0016829 A1* | 1/2020 | Ameloot | B33Y 10/00 |

FOREIGN PATENT DOCUMENTS

| CN | 101397480 A | 4/2009 |
| CN | 104098784 A | 10/2014 |
| CN | 105538714 A | 5/2016 |
| CN | 107312463 A | 11/2017 |

* cited by examiner

*Primary Examiner* — Shuangyi Abu Ali

(57) ABSTRACT

Disclosed is a polishing fluid for improving surfaces formed by fused deposition molding with ABS, consisting of 30%-40% by weight of polymethyl methacrylate and 60%-70% by weight of a mixture. This application further discloses a method of preparing the polishing fluid by mixing under heating. The polishing fluid provided herein can quickly form a film on surfaces of the workpiece to be processed and fill depressions of the surfaces of the workpiece while dissolving the protrusions on the surfaces to render the surfaces smooth and even.

2 Claims, No Drawings

POLISHING FLUID FOR IMPROVING SURFACES FORMED BY FUSED DEPOSITION MOLDING WITH ABS AND METHOD OF PREPARING SAME

CROSS-REFERENCE TO RELATED APPLICATIONS

This application claims the benefit of priority from Chinese Patent Application No. 201910579424.0, filed on Jun. 28, 2019. The content of the aforementioned application, including any intervening amendments thereto, is incorporated herein by reference in its entirety.

TECHNICAL FIELD

The present application relates to surface polishing fluid, and more particularly to a polishing fluid for improving surfaces formed by fused deposition molding with acrylonitrile-butadiene-styrene (ABS) and a method for preparing the same.

BACKGROUND

Fused Deposition Modeling (FDM) is the reverse process of tomography, in which a part is manufactured layer by layer. Specifically, filaments are melted and deposited layer by layer, and then the layers are bonded to form a three-dimensional object, which is further processed into components of any complexity. Compared with the traditional molding, the FDM technique not only greatly shortens the processing cycle and lowers the investment cost, but also can manufacture parts with more complex structure, and thus has been applied in a variety of fields. However, the layer-by-layer printing in the additive manufacturing process renders the surface of the manufactured parts step-shaped and uneven, affecting the appearance and use of the parts. It has been found that the unevenness in the surface can be reduced or eliminated by swelling the plastic parts with methyl methacrylate (MMA), thereby improving the surface quality.

There are many methods to polish parts manufactured by fused deposition modeling, enabling the polishing of parts involving different complexities and precision requirements. For example, the polishing treatment can be accomplished by applying a coating onto the surface just like the way of nail-painting or wall-painting, while this method generally involves poor adhesive force and an increase in size. Besides, organic solvents are also often used to polish the parts, such as acetone, ethyl acetate, butanone, dimethylacetamide, xylene, toluene, trichloroethylene, methyl ethyl ketone, methylene chloride, n-propyl bromide and perchloroethylene, where the organic solvent is heated at a high temperature to form steam or prepared into an aqueous solution, and then the steam or the aqueous solution is directly applied to the surfaces of plastic parts to provide a swelling effect, so as to uniformly polish the surfaces of the plastic parts. However, such surface treatment method has long fumigation or immersion time, which may greatly affect physical properties of matrix materials, and the organic solvents used therein are toxic or slightly toxic and volatile, and are prone to explosion after being overheated.

SUMMARY

An object of this application is to provide a polishing fluid for improving surfaces of parts fabricated by fused deposition molding with ABS, which has high bonding strength and is free of toxicity.

Another object of the application is to provide a method for preparing the above-mentioned polishing fluid.

The technical solutions of the application are described as follows.

In one aspect, the application provides a polishing fluid for improving a surface formed by fused deposition molding with ABS, consisting of 30%-40% by weight of polymethyl methacrylate and 60%-70% by weight of a second mixture; wherein the second mixture consists of 40%-50% by weight of methyl methacrylate, 25%-35% by weight of ethyl acetate, 5%-10% by weight of butanone and 15%-25% by weight of ethanol.

In another aspect, the application provides a method of preparing the above polishing fluid for improving the surfaces of the parts fabricated by fused deposition molding with ABS, comprising:

1) uniformly mixing 40%-50% by weight of methyl methacrylate, 25%-35% by weight of ethyl acetate, 5%-10% by weight of butanone and 15%-25% by weight of ethanol to obtain a first mixture;

2) heating the first mixture to 30-50° C. to obtain the second mixture; and 3) uniformly mixing 30%-40% by weight of polymethyl methacrylate and 60%-70% by weight of the second mixture to obtain the polishing fluid.

Compared to the prior art, the application has the following beneficial effects.

The polishing fluid for improving the surfaces of the parts fabricated by fused deposition molding with ABS provided herein can quickly form a film on a surface of the workpiece to be processed and fill the depressions on the surface while dissolving the protrusions on the surfaces of the workpiece to render the surface smooth and even. Moreover, the polishing fluid has high bonding strength, desirable polishing precision, good surface quality and wide application, and can facilitate shortening the polishing cycle and polishing workpieces of any size. The method of preparing the polishing fluid in the application involves simple operation, easy implementation and high preparation efficiency.

DETAILED DESCRIPTION OF EMBODIMENTS

This application will be described in detail below with reference to the embodiments.

The application provides a polishing fluid for improving surfaces formed by fused deposition molding with ABS, consisting of 30%-40% by weight of polymethyl methacrylate and 60%-70% by weight of a second mixture;

where the second mixture consists of 40%-50% by weight of methyl methacrylate, 25%-35% by weight of ethyl acetate, 5%-10% by weight of butanone and 15%-25% by weight of ethanol.

The application further provides a method of preparing the above polishing fluid for improving the surfaces of the parts fabricated by fused deposition molding with ABS, including:

1) uniformly mixing 40%-50% by weight of methyl methacrylate, 25%-35% by weight of ethyl acetate, 5%-10% by weight of butanone and 15%-25% by weight of ethanol to obtain a first mixture;

2) heating the first mixture to 30-50° C. to obtain the second mixture; and 3) mixing 30%-40% by weight of polymethyl methacrylate and 60%-70% by weight of the second mixture uniformly to obtain the polishing fluid for improving the surfaces of the parts fabricated by fused deposition molding with ABS.

Example 1

Provided herein was a polishing fluid for improving surfaces of parts fabricated by fused deposition molding with ABS, consisting of 30% by weight of polymethyl methacrylate and 70% by weight of a second mixture, where the second mixture consisted of 40% by weight of methyl methacrylate, 25% by weight of ethyl acetate, 10% by weight of butanone and 25% by weight of ethanol.

A method of preparing the above polishing fluid was also provided herein, which was performed as follows.

1) 40% by weight of methyl methacrylate, 25% by weight of ethyl acetate, 10% by weight of butanone and 25% by weight of ethanol were uniformly mixed to obtain a first mixture.

2) The first mixture was heated to 30° C. to obtain the second mixture.

3) 30% by weight of polymethyl methacrylate and 70% by weight of the second mixture were uniformly mixed to obtain the polishing fluid.

The polishing fluid prepared herein was uniformly sprayed onto a workpiece having a surface roughness of 10.53 μm (Ra). After the polishing fluid on the surface of the workpiece was naturally dried, the surface roughness of the workpiece was decreased to 0.025 μm (Ra), indicating that the polishing fluid can significantly improve the evenness of the surface of the workpiece.

Example 2

Provided herein was a polishing fluid for improving surfaces of parts fabricated by fused deposition molding with ABS, consisting of 40% by weight of polymethyl methacrylate and 60% by weight of a second mixture, where the second mixture consisted of 50% by weight of methyl methacrylate, 25% by weight of ethyl acetate, 10% by weight of butanone and 25% by weight of ethanol.

A method of preparing the above polishing fluid was also provided herein, which was performed as follows.

1) 50% by weight of methyl methacrylate, 25% by weight of ethyl acetate, 10% by weight of butanone and 15% by weight of ethanol were uniformly mixed to obtain a first mixture.

2) The first mixture was heated to 50° C. to obtain the second mixture.

3) 40% by weight of polymethyl methacrylate and 60% by weight of the second mixture were uniformly mixed to obtain the polishing fluid.

The polishing fluid prepared herein was uniformly sprayed onto a workpiece having a surface roughness of 8.61 μm (Ra). After the polishing fluid on the surface of the workpiece was naturally dried, the surface roughness of the workpiece was decreased to 0.021 μm (Ra), indicating that the polishing fluid can significantly improve the evenness of the surface of the workpiece.

Example 3

Provided herein was a polishing fluid for improving surfaces of parts fabricated by fused deposition molding with ABS, consisting of 32% by weight of polymethyl methacrylate and 68% by weight of a second mixture, where the second mixture consisted of 47% by weight of methyl methacrylate, 28% by weight of ethyl acetate, 5% by weight of butanone and 25% by weight of ethanol.

A method of preparing the above polishing fluid was also provided herein, which was performed as follows.

1) 47% by weight of methyl methacrylate, 28% by weight of ethyl acetate, 5% by weight of butanone and 15% by weight of ethanol were uniformly mixed to obtain a first mixture.

2) The first mixture was heated to 38° C. to obtain the second mixture.

3) 32% by weight of polymethyl methacrylate and 68% by weight of the second mixture were uniformly mixed to obtain the polishing fluid.

The polishing fluid prepared herein was uniformly sprayed onto a workpiece having a surface roughness of 17.22 μm (Ra). After the polishing fluid on the surface of the workpiece was naturally dried, the surface roughness of the workpiece was decreased to 0.034 μm (Ra), indicating that the polishing fluid can significantly improve the evenness of the surface of the workpiece.

Example 4

Provided herein was a polishing fluid for improving surfaces of parts fabricated by fused deposition molding with ABS, consisting of 35% by weight of polymethyl methacrylate and 65% by weight of a second mixture, where the second mixture consisted of 45% by weight of methyl methacrylate, 35% by weight of ethyl acetate, 5% by weight of butanone and 15% by weight of ethanol.

A method of preparing the above polishing fluid was also provided herein, which was performed as follows.

1) 45% by weight of methyl methacrylate, 35% by weight of ethyl acetate, 5% by weight of butanone and 15% by weight of ethanol were uniformly mixed to obtain a first mixture.

2) The first mixture was heated to 40° C. to obtain the second mixture.

3) 35% by weight of polymethyl methacrylate and 65% by weight of the second mixture were uniformly mixed to obtain the polishing fluid.

The polishing fluid prepared herein was uniformly sprayed onto a workpiece having a surface roughness of 13.57 μm (Ra). After the polishing fluid on the surface of the workpiece was naturally dried, the surface roughness of the workpiece was decreased to 0.026 μm (Ra), indicating that the polishing fluid can significantly improve the evenness of the surface of the workpiece.

Example 5

Provided herein was a polishing fluid for improving surfaces of parts fabricated by fused deposition molding with ABS, consisting of 38% by weight of polymethyl methacrylate and 62% by weight of a second mixture, where the second mixture consisted of 43% by weight of methyl methacrylate, 27% by weight of ethyl acetate, 8% by weight of butanone and 22% by weight of ethanol.

A method of preparing the above polishing fluid was also provided herein, which was performed as follows.

1) 43% by weight of methyl methacrylate, 27% by weight of ethyl acetate, 8% by weight of butanone and 22% by weight of ethanol were uniformly mixed to obtain a first mixture.

2) The first mixture was heated to 30-50° C. to obtain the second mixture.

3) 38% by weight of polymethyl methacrylate and 62% by weight of the second mixture were uniformly mixed to obtain the polishing fluid.

The polishing fluid prepared herein was uniformly sprayed onto a workpiece having a surface roughness of 12.68 μm (Ra). After the polishing fluid on the surface of the workpiece was naturally dried, the surface roughness of the workpiece was decreased to 0.030 μm (Ra), indicating that the polishing fluid can significantly improve the evenness of the surface of the workpiece.

What is claimed is:

1. A polishing fluid for improving a surface formed by fused deposition molding with acrylonitrile-butadiene-styrene, consisting of 30%-40% by weight of polymethyl methacrylate and 60%-70% by weight of a second mixture;
   wherein the second mixture consists of 40%-50% by weight of methyl methacrylate, 25%-35% by weight of ethyl acetate, 5%-10% by weight of butanone and 15%-25% by weight of ethanol.

2. A method of preparing the polishing fluid of claim 1, comprising:
   1) uniformly mixing 40%-50% by weight of methyl methacrylate, 25%-35% by weight of ethyl acetate, 5%-10% by weight of butanone and 15%-25% by weight of ethanol to obtain a first mixture, wherein the sum of the weight percentages is 100% based on the first mixture;
   2) heating the first mixture to 30-50° C. to obtain the second mixture; and
   3) uniformly mixing 30%-40% by weight of polymethyl methacrylate and 60%-70% by weight of the second mixture to obtain the polishing fluid.

* * * * *